(12) United States Patent
Hansen et al.

(10) Patent No.: US 12,441,178 B2
(45) Date of Patent: Oct. 14, 2025

(54) COOLING SYSTEM FOR A MACHINE

(71) Applicant: CNH Industrial America LLC, New Holland, PA (US)

(72) Inventors: Marc Hansen, New Holland, PA (US); Daniel Morey, New Holland, PA (US); Daniel Zurn, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 505 days.

(21) Appl. No.: 18/074,959

(22) Filed: Dec. 5, 2022

(65) Prior Publication Data
US 2024/0181867 A1    Jun. 6, 2024

(51) Int. Cl.
*B60K 11/04*    (2006.01)
*B62D 33/06*    (2006.01)

(52) U.S. Cl.
CPC .......... *B60K 11/04* (2013.01); *B62D 33/0617* (2013.01)

(58) Field of Classification Search
CPC ............................ B60K 11/04; B62D 33/0617
See application file for complete search history.

(56) References Cited

U.S. PATENT DOCUMENTS

| | | | |
|---|---|---|---|
| 5,152,364 A * | 10/1992 | Woods .................... | B62D 49/06 180/69.1 |
| 6,202,777 B1 | 3/2001 | Surridge | |
| 7,051,786 B2 * | 5/2006 | Vuk ........................ | B60K 11/04 165/41 |
| 7,836,967 B2 | 11/2010 | Daniel et al. | |
| 8,167,067 B2 | 5/2012 | Peterson et al. | |
| 8,256,551 B2 | 9/2012 | Entriken et al. | |
| 8,544,584 B2 | 10/2013 | Takeda et al. | |
| 9,045,039 B2 | 6/2015 | Ringer et al. | |
| 9,243,846 B2 | 1/2016 | Cummins et al. | |
| 9,822,736 B2 | 11/2017 | Roehr et al. | |

(Continued)

FOREIGN PATENT DOCUMENTS

| | | |
|---|---|---|
| CN | 106794754 B | 2/2019 |
| DE | 19724728.1 A1 | 2/1999 |

(Continued)

OTHER PUBLICATIONS

"Rocket Science—Achieving Better Engine Cooling With Proper Aerodynamic Principles" published May 3, 2016, https://nasaspeed.news/tech/engine/rocket-science-achieving-better-engine-cooling-with-proper-aerodynamic-principles/.

*Primary Examiner* — Bryan A Evans
(74) *Attorney, Agent, or Firm* — Foley & Lardner LLP

(57) ABSTRACT

A machine includes a frame, a front axle coupled to the frame, a pair of front tractive elements coupled to the front axle, a prime mover coupled to the frame, and a cooling system. The pair of front tractive elements are steerable through a range of motion that defines a tractive element cloud. The cooling system includes a fan and a cooling pack. The fan system is positioned in front of the prime mover and at least partially over the front axle. The cooling pack includes a plurality of heat exchangers. The cooling pack is positioned in front of the fan system such that the cooling pack and the fan system cooperatively define a space therebetween. The pair of front tractive elements are configured to be steered behind the cooling pack and into the space such that the cooling pack is positioned in front of the tractive element cloud.

20 Claims, 11 Drawing Sheets

(56) References Cited

U.S. PATENT DOCUMENTS

| | | | |
|---|---|---|---|
| 10,287,962 B2 | 5/2019 | Kurokawa et al. | |
| 11,214,138 B2* | 1/2022 | Uozumi | B62D 35/02 |
| 12,024,010 B2* | 7/2024 | Stinner | B60K 11/08 |
| 2002/0117345 A1* | 8/2002 | Sztykiel | B60K 11/04 |
| | | | 180/291 |
| 2006/0103127 A1 | 5/2006 | Lie et al. | |
| 2008/0000615 A1* | 1/2008 | Hiroshima | F01P 3/18 |
| | | | 165/41 |
| 2010/0326755 A1 | 12/2010 | Husson et al. | |

FOREIGN PATENT DOCUMENTS

| | | |
|---|---|---|
| EP | 0 503 350 B1 | 9/1992 |
| EP | 2 543 775 B1 | 1/2013 |
| EP | 2 604 460 B1 | 4/2016 |
| GB | 2 336 662 A | 10/1999 |
| JP | 4906486 B2 | 1/2012 |

* cited by examiner

COOLING SYSTEM FOR A MACHINE

BACKGROUND

Machines and vehicles include cooling packages to thermally regulate the temperature of various components and systems thereof (e.g., driveline components, hydraulic systems, air conditioning systems, etc.). Such cooling packages are typically oriented perpendicular to airflow and normal to a frame of the machines and vehicles. However, due to packaging and operator visibility constraints, such an orientation of the cooling packages can limit the sizing and, therefore, the cooling capabilities of the cooling packages.

SUMMARY

One embodiment relates to a machine. The machine includes a frame, a front axle coupled to the frame, a pair of front tractive elements coupled to the front axle, a prime mover coupled to the frame, and a cooling system. The pair of front tractive elements are steerable through a range of motion that defines a tractive element cloud. The prime mover is positioned rearward of the front axle. The cooling system includes a fan and a cooling pack. The fan system is positioned in front of the prime mover and at least partially over the front axle in a fan over axle arrangement. The cooling pack includes a plurality of heat exchangers. The cooling pack is positioned in front of the fan system such that the cooling pack and the fan system cooperatively define a space therebetween. The pair of front tractive elements are configured to be steered behind the cooling pack and into the space such that the cooling pack is positioned in front of the tractive element cloud.

Another embodiment relates to a cooling system for a machine. The cooling system includes a fan system and a cooling pack. The fan system is configured to be positioned in front of a prime mover of the machine and at least partially over a front axle of the machine in a fan over axle arrangement. The cooling pack is configured to be positioned in front of the fan system such that the cooling pack and the fan system cooperatively define a space therebetween. The cooling pack includes a first heat exchanger and a second heat exchanger. The first heat exchanger is configured to be oriented at a first angle. The second heat exchanger is configured to extend rearward from an upper end of the first heat exchanger toward the fan system. The second heat exchanger is configured to be oriented at a second angle that is greater than the first angle. The space is configured to facilitate steering front tractive elements of the machine between the fan system and the cooling pack such that the cooling pack is positioned in front of and above a tractive element cloud of the front tractive elements.

Still another embodiment relates to a machine. The machine includes a frame, a cab supported by the frame, a front axle coupled to the frame, a pair of front tractive elements coupled to the front axle, a prime mover coupled to the frame and positioned rearward of the front axle, a fan system positioned in front of the prime mover and at least partially over the front axle in a fan over axle arrangement, a cooling pack positioned in front of the fan system such that the cooling pack and the fan system cooperatively define a space therebetween, and a hood extending over the prime mover, the fan system, and the cooling pack. The pair of front tractive elements are steerable through a range of motion that defines a tractive element cloud. The cooling pack includes a first heat exchanger and a second heat exchanger. The first heat exchanger is oriented at a first angle. The second heat exchanger extends rearward from an upper end of the first heat exchanger toward the fan system. The second heat exchanger is oriented at a second angle that is greater than the first angle. The pair of front tractive elements are configured to be steered behind the cooling pack, underneath the cooling pack, and into the space such that the cooling pack is positioned in front of and above the tractive element cloud. The orientation of the first heat exchanger and the second heat exchanger enhances visibility from the cab over the hood by providing a sightline from an operator viewpoint within the cab that extends over a top of the hood to a point on the ground where a horizontal distance of the sightline between the operator viewpoint and the point on the ground is at most twelve meters.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
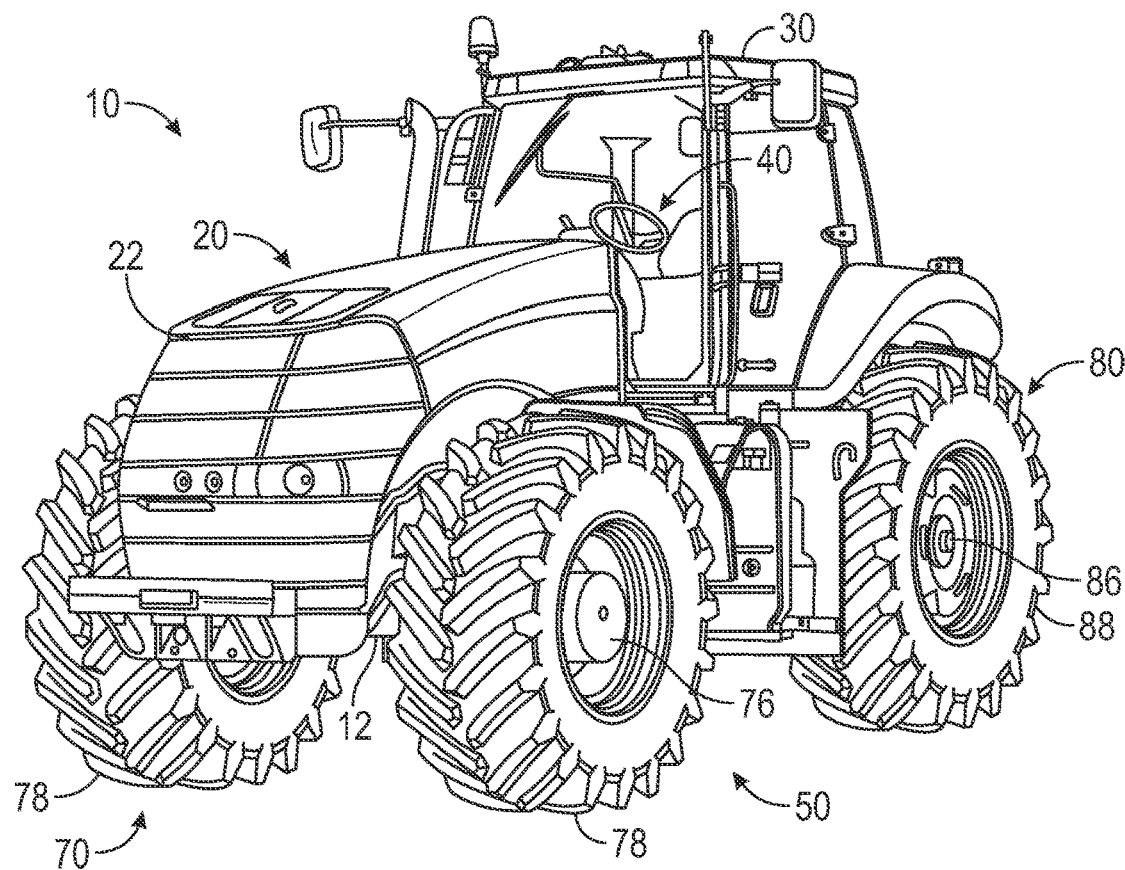
FIG. 1 is a perspective view of a vehicle, according to an exemplary embodiment.
Figure 2:
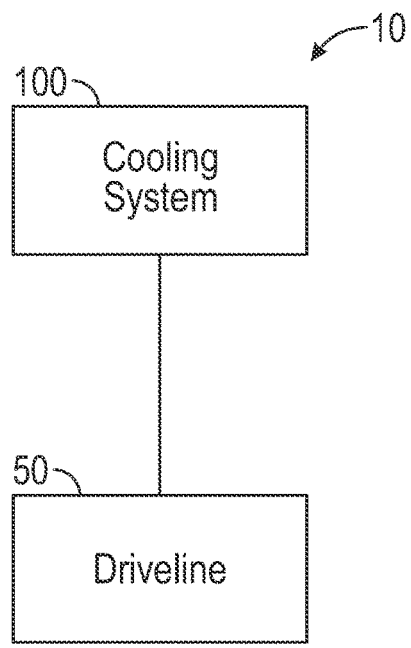
FIG. 2 is a schematic block diagram of the vehicle of FIG. 1, according to an exemplary embodiment.
Figure 3:
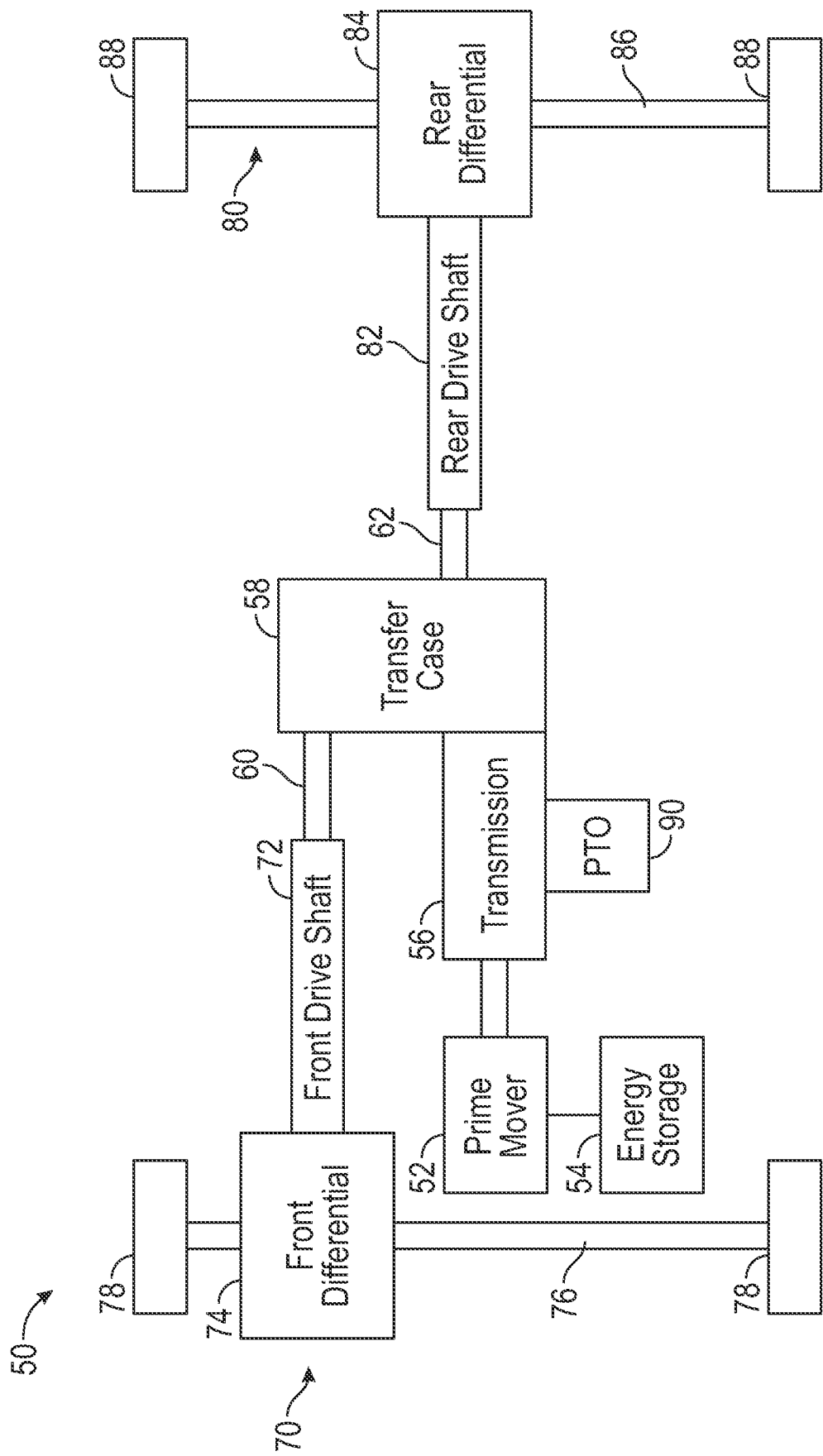
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having a hood, shown as hood 22, and an occupant portion or section, shown as cab 30; operator input and output devices, shown as operator interface 40, that are disposed within the cab 30; a drivetrain, shown as driveline 50, coupled to the frame 12 and at least partially disposed under the body 20; and a vehicle cooling assembly, shown as cooling system 100, disposed under the body 20 (e.g., under the hood 22 thereof) and configured to facilitate cooling one or more components of the vehicle 10 (e.g., an engine, a transmission, a hydraulic circuit, a forced induction or turbocharger circuit, etc.). In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input devices may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Cooling System

Figure 8:
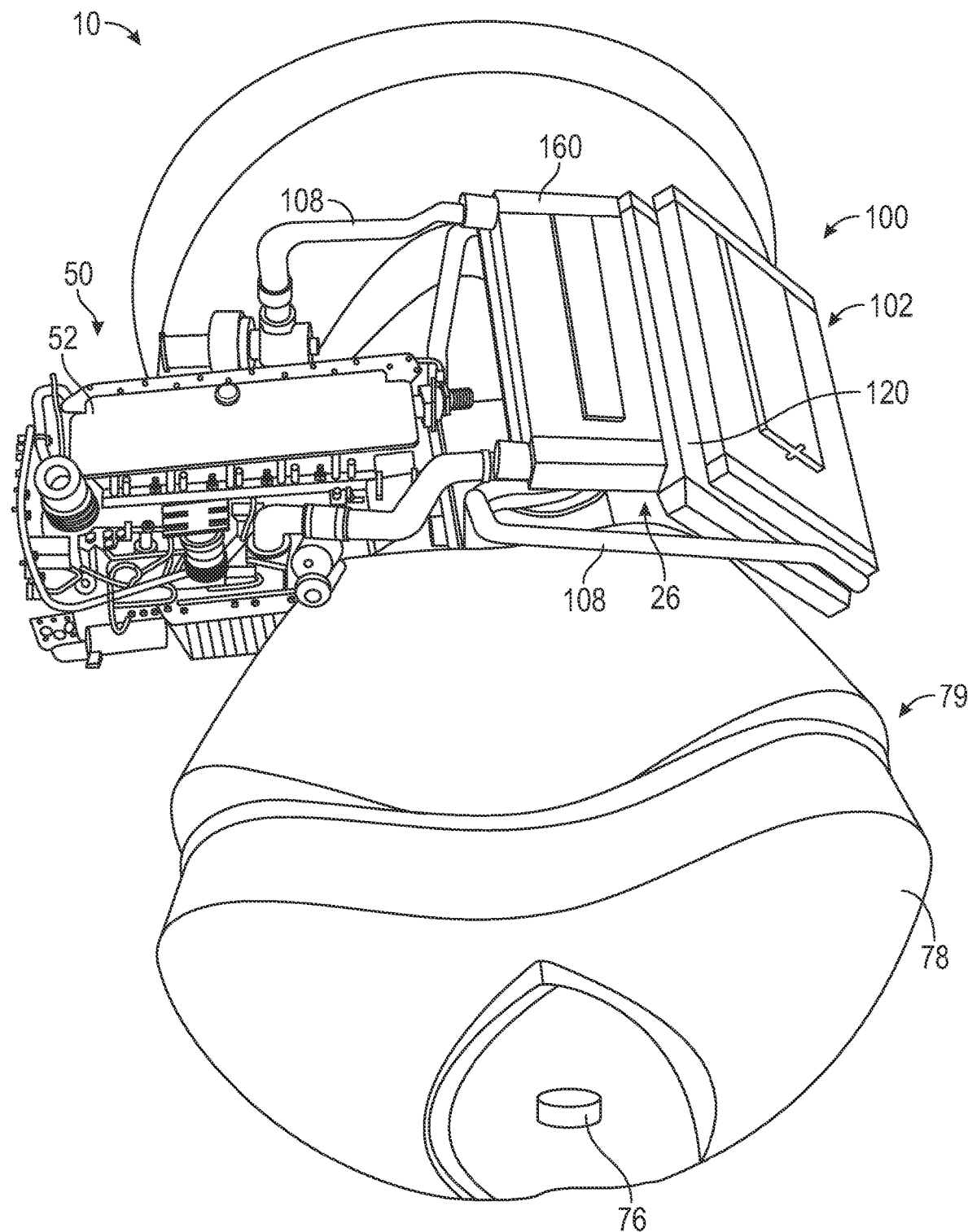
Figure 9:
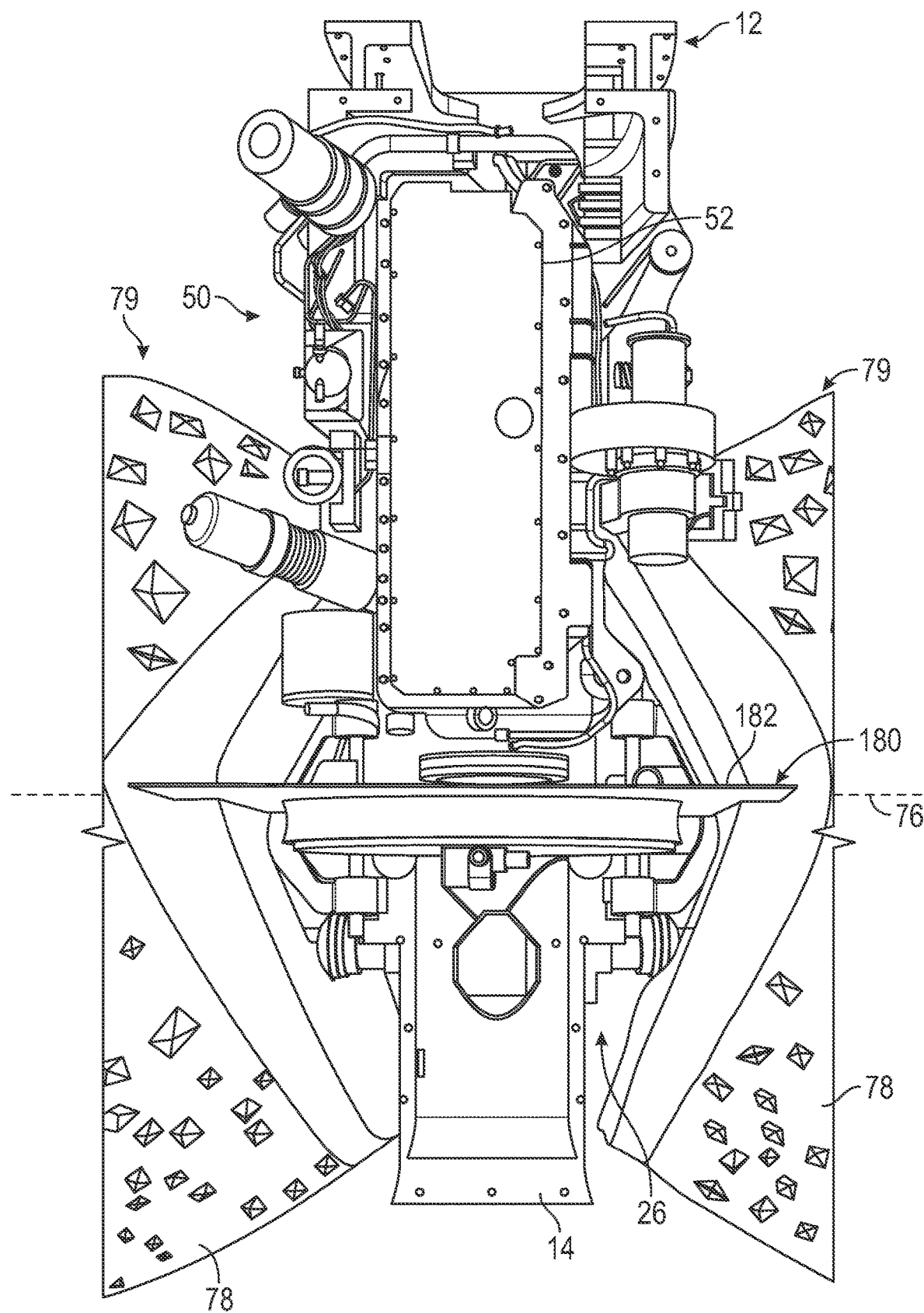
Figure 10:
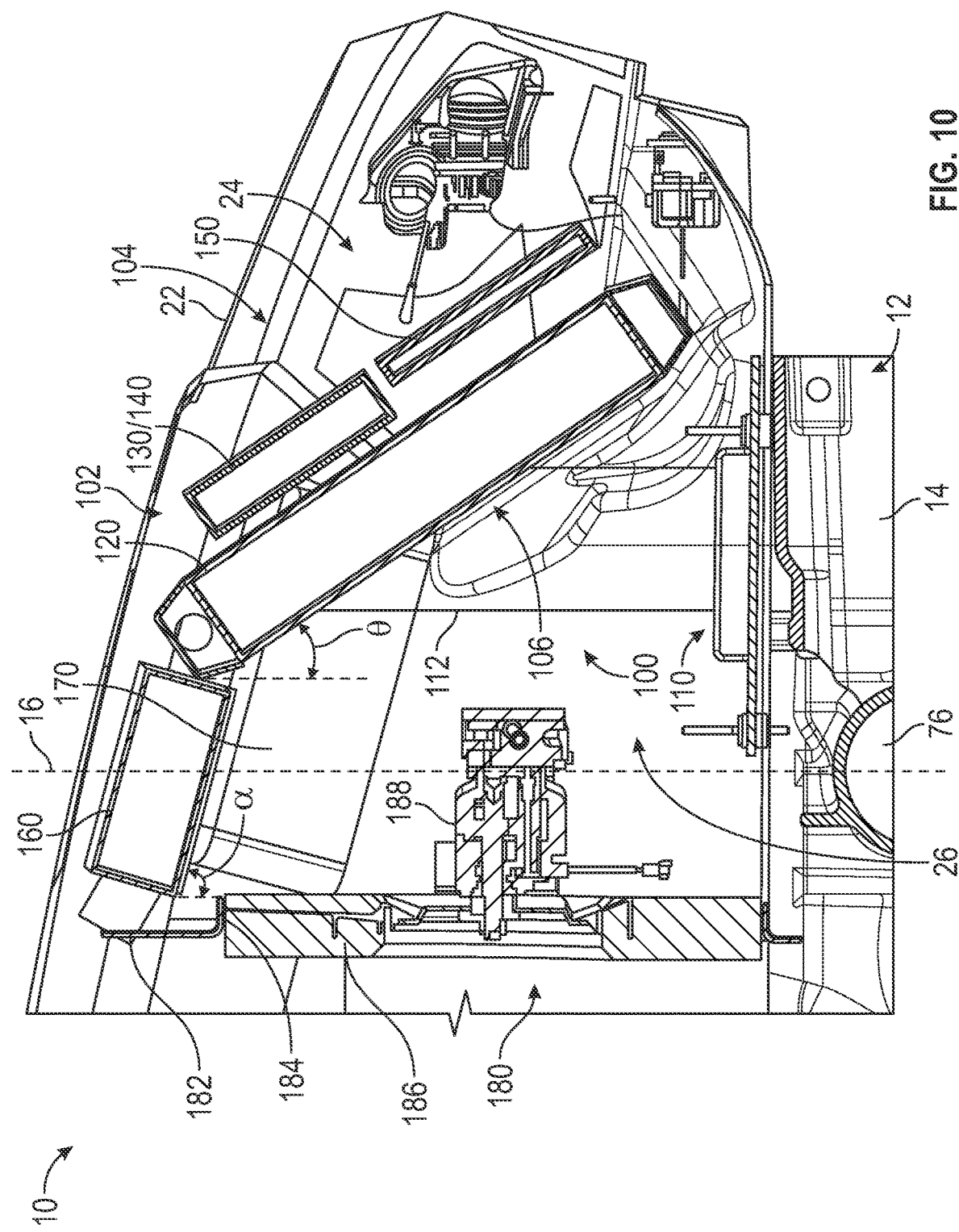
FIG. 10 is a cross-sectional view of the cooling system of the vehicle of FIG. 1, according to an exemplary embodiment.

According to the exemplary embodiment shown in FIGS. 4-10, the cooling system 100 includes (i) a cooling pack, shown as cooling pack 102, having a first side, shown as front side 104, that faces toward a front end of the vehicle 10 and an opposing second side, shown as rear side 106, that faces toward the rear end of the vehicle 10; (ii) a plurality of conduits, shown as conduits 108, that fluidly couple the cooling pack 102 to various components 200 of the vehicle and/or the driveline 50; (iii) one or more frame components, shown as frame assembly 110, that supports and couples the cooling pack 102 to the frame 12 of the vehicle 10; and (iv) a fan assembly, shown as fan system 180, that drives air through the cooling pack 102 to facilitate thermally regulating or cooling the components 200 of the vehicle 10 and/or the driveline 50. As shown in FIG. 10, the cooling system 100 is positioned within a cavity, shown as hood chamber 24, defined between the hood 22 and the frame 12, and proximate the front end of the vehicle 10.

According to an exemplary embodiment, the cooling pack 102 includes a plurality of cooling components (e.g., coolers, heat exchangers, etc.) configured to facilitate cooling the components 200 of the vehicle 10 and/or the driveline 50. As shown in FIGS. 4-6 and 10, the plurality of cooling components of the cooling pack 102 include (i) a first cooling component, shown as radiator 120; (ii) a second cooling component, shown as primary oil cooler 130, positioned in front of a first portion (e.g., an upper, first side portion) of the radiator 120 (e.g., in a stacked arrangement); (iii) a third cooling component, shown as fuel cooler 140, positioned in front of a second portion (e.g., an upper, opposing second side portion) of the radiator 120 (e.g., in a stacked arrangement) and adjacent a side of the primary oil cooler 130; (iv) a fourth cooling component, shown as condenser 150, positioned in front of a third portion (e.g., a lower portion) of the radiator 120 and vertically offset from (e.g., below or above) the primary oil cooler 130 and the fuel cooler 140; (v) a fifth cooling component, shown as charge air cooler 160, positioned at least partially above and/or rearward of the radiator 120; and (vi) one or more sixth cooling components, shown as secondary oil coolers 170, positioned along a left side and/or a right side of the radiator 120 and the charge air cooler 160. While various cooling components and the positioning thereof are shown, it should be understood that the specific cooling components and their positioning may vary. For example, the cooling components may be packaged in a different arrangement, one or more of the cooling components may be replaced with a different type of cooling component (e.g., depending on the specific vehicle subsystems), one or more of the cooling components may be removed, and/or additional cooling components may be added. In some embodiments, the cooling pack 102 does not include the secondary oil coolers 170.

Figure 4:
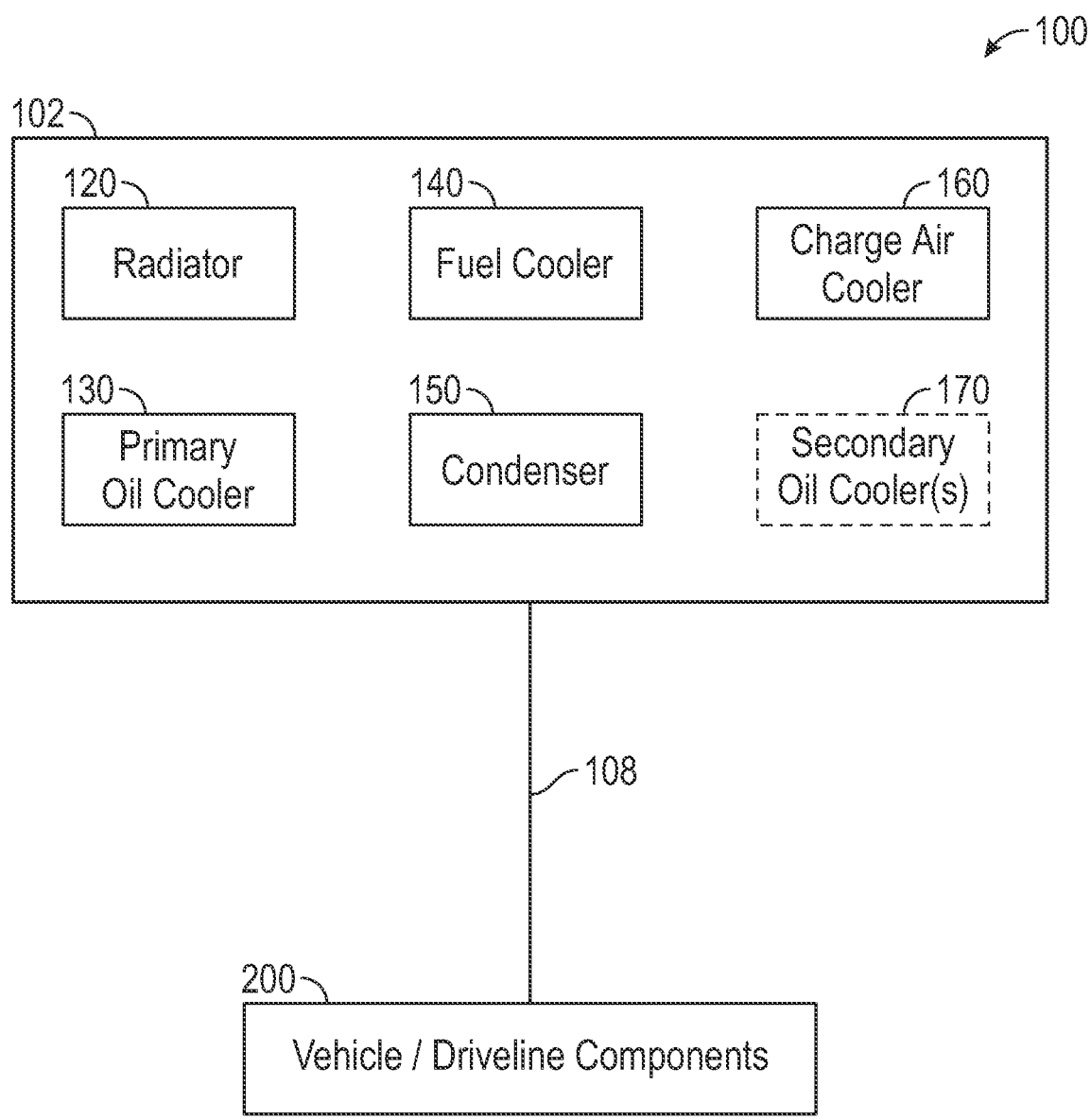
FIG. 4 is a schematic block diagram of a cooling system of the vehicle of FIG. 1, according to an exemplary embodiment.
Figure 5:
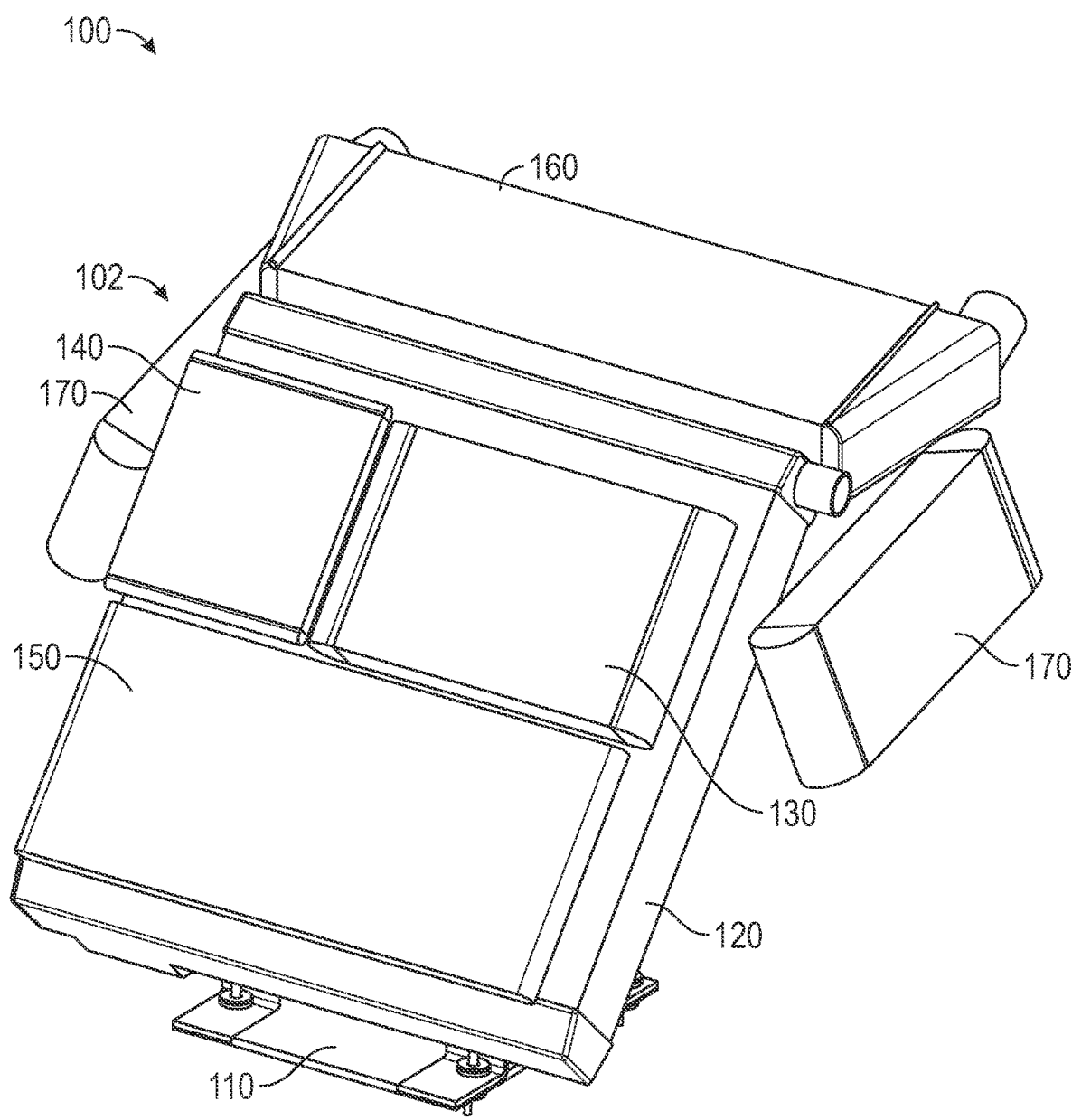
FIG. 5 is a front, right perspective view of the cooling system of FIG. 4, according to an exemplary embodiment.

As shown in FIG. 4, the conduits 108 of the cooling system 100 extend from the various cooling components of the cooling pack 102 (e.g., the radiator 120, the primary oil cooler 130, the fuel cooler 140, the condenser 150, the charge air cooler 160, the secondary oil cooler(s) 170, etc.) to the components 200 of the driveline 50 and/or the vehicle 10. By way of example, the conduits 108 may fluidly couple the radiator 120 to the prime mover 52 of the driveline 50 to cool coolant for the prime mover 52. By way of another example, the conduits 108 may fluidly couple the primary oil cooler 130 to a hydraulic circuit of the vehicle 10 to cool hydraulic oil within and/or hydraulic components of (e.g., hydraulic pump(s), hydraulic oil reservoir(s), hydraulic cylinder(s), etc.) the hydraulic circuit. By way of another example, the conduits 108 may fluidly couple the primary oil cooler 130 to the prime mover 52 of the driveline 50 to cool oil for the prime mover 52. By way of another example, the conduits 108 may fluidly couple the fuel cooler 140 to a fueling circuit of the vehicle 10 to cool fuel within the fueling circuit. By way of another example, the conduits 108 may fluidly couple the condenser 150 to an air conditioning circuit of the vehicle 10 to cool air conditioning refrigerant within the air conditioning circuit. By way of another example, the conduits 108 may fluidly couple the charge air cooler 160 between the engine and turbocharger assembly (i.e., the charge air circuit) of the driveline 50 of the vehicle 10 to cool charged air exiting the turbocharger and before entering the engine. By way of another example, the conduits 108 may fluidly couple the secondary oil cooler(s) 170 to the same oil sources as or different oil sources (e.g., hydraulic circuits, engine oil circuits, etc.) than the primary oil cooler 130 to provide additional or supplemental oil cooling capacity.

As shown in FIGS. 6-10, the cooling pack 102 is positioned proximate a front end of the vehicle 10, the fan system 180 is positioned behind or rearward of the cooling pack 102 on the rear side 106 thereof, and the prime mover 52 is positioned behind or rearward of the fan system 180. In such an arrangement, the fan system 180 is configured to pull air from the front side 104 of the cooling pack 102 through the various cooling components thereof. While shown as being positioned on the rear side 106 of the cooling pack 102, in other embodiments, the fan system 180 is positioned on the front side 104 of the cooling pack 102 such that the fan system 180 pushes air through the various cooling components of the cooling pack 102.

Figure 6:
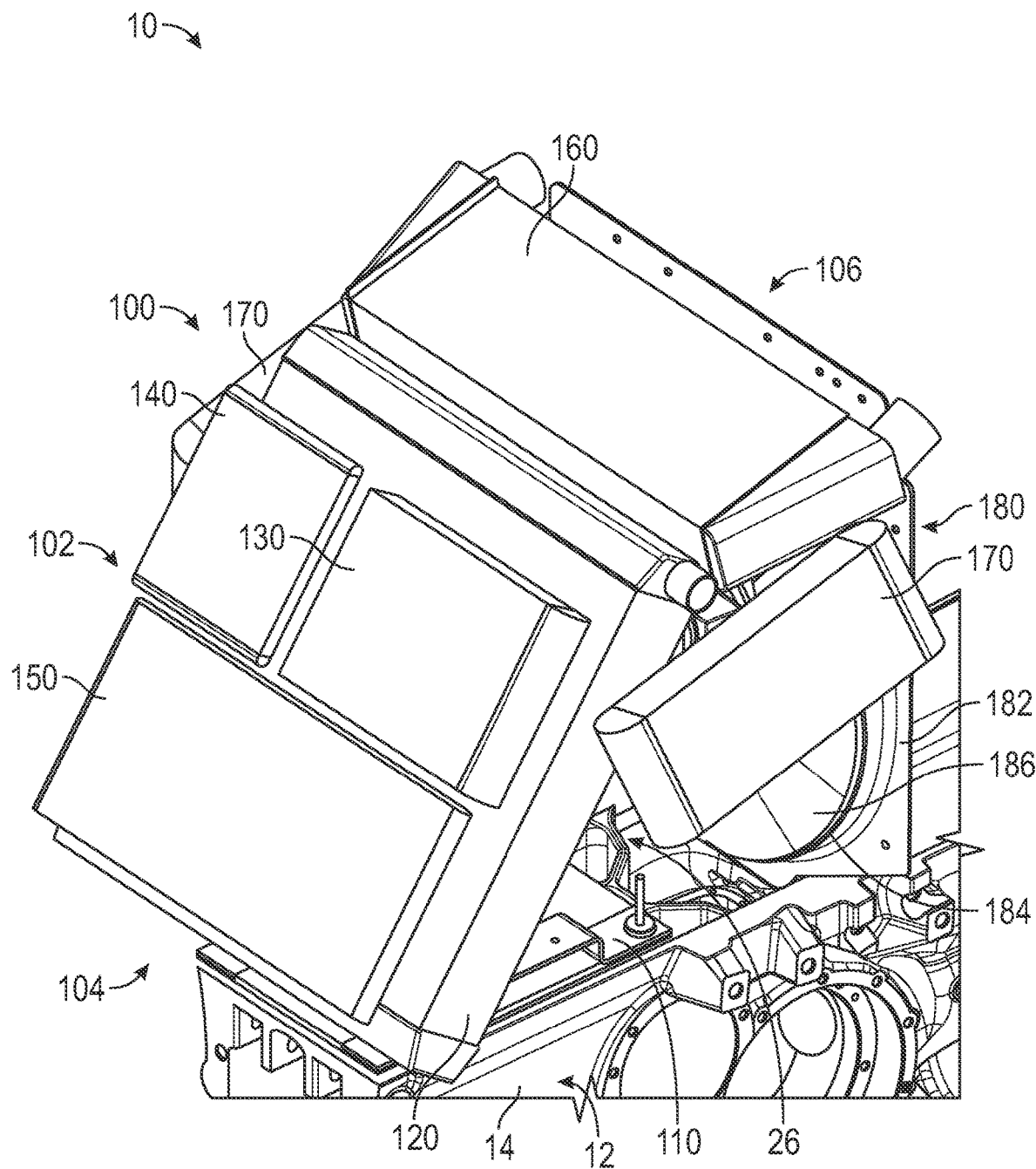
FIG. 6 is front, right perspective view of a cooling pack of the cooling system of FIG. 5, according to an exemplary embodiment.

As shown in FIGS. 6 and 10, the frame assembly 110 is coupled to a housing, shown as axle housing 14, of the frame 12. The axle housing 14 defines an interface that receives and supports the front axle 76 of the vehicle 10. In some embodiments, the frame assembly 110 is coupled to the axle housing 14 with rubber isolator to dampen vibrations from the vehicle 10. As shown in FIG. 10, the frame assembly 110 is coupled to the axle housing 14 at a position in front of a vertical plane 16 defined by the front axle 76 and, therefore, at least a portion of the cooling pack 102 (or at least a portion of one or more of the cooling components of the cooling pack 102) is positioned in front of the front axle 76. The frame assembly 110 may include a plurality of frame elements, shown as cooling pack supports 112, that support the various component of the cooling pack 102.

As shown in FIGS. 6, 9, and 10, the fan system 180 includes a fan housing, shown as fan shroud 182. As shown in FIG. 10, the fan shroud 182 is coupled to the frame assembly 110 of the cooling system 100. Such an arrangement allows the fan system 180 and the cooling pack 102 to move together as the vehicle 10 is driven (which simplifies the sealing between the fan system 180 and the cooling pack 102). In other embodiments, the fan shroud 182 is coupled to the axle housing 14 of the frame 12 of the vehicle 10. As shown in FIGS. 9 and 10, the fan shroud 182 defines an aperture, shown as fan aperture 184, that receives an air driver, shown as fan 186, such that the fan 186 is positioned within the fan shroud 182. According to the exemplary embodiment shown in FIG. 10, the fan system 180 includes an independent fan driver, shown as fan motor 188, that drives the fan 186 to force (e.g., pull, push, etc.) air through the various cooling components (e.g., the radiator 120, the primary oil cooler 130, the fuel cooler 140, the condenser 150, the charge air cooler 160, the secondary oil cooler(s) 170, etc.) of the cooling pack 102 and the fan aperture 184. In other embodiments, the fan system 180 does not include the fan motor 188, but rather, the fan 186 is driven by the prime mover 52 (e.g., via the PTO 90, via a pulley/belt mechanism, etc.).

Figure 7:
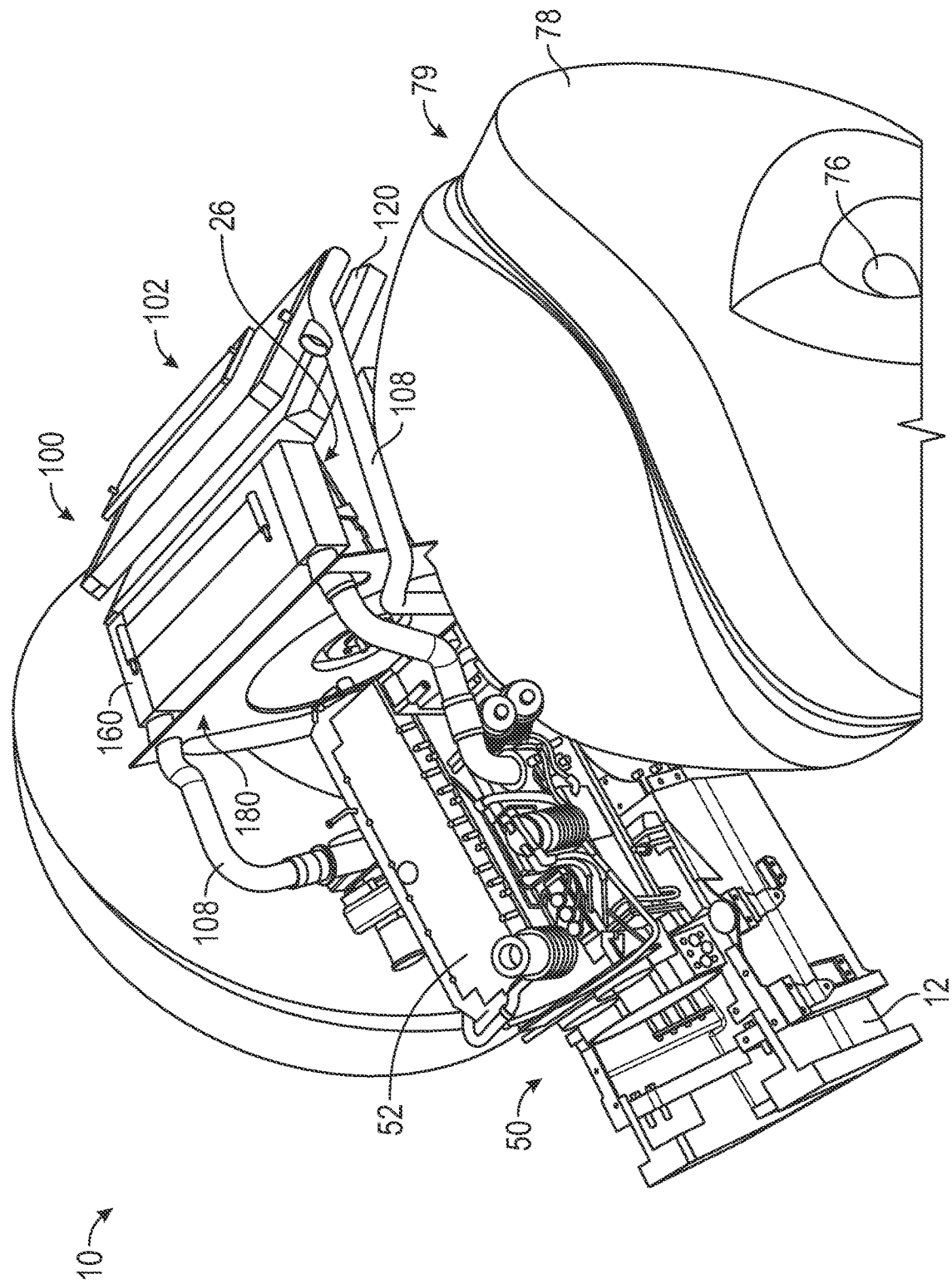
FIGS. 7-9 are various views of the driveline and the cooling system of the vehicle of FIG. 1, according to an exemplary embodiment.

According to the exemplary embodiment shown in FIG. 9, the fan shroud 182 is disposed at a position such that the fan system 180 is substantially positioned directly above the front axle 76. According to the exemplary embodiment shown in FIG. 10, the fan shroud 182 is coupled to the frame assembly 110 (or, alternatively, the axle housing 14) at a position such that the fan system 180 is at least partially positioned directly above the front axle 76 (e.g., the fan motor 188 extends across the vertical plane 16, at least a portion of the fan system 180 is positioned above the front axle 76, etc.). In either arrangement, the fan system 180 may be referred to as a "fan over axle" fan system. As shown in FIGS. 7-9, the prime mover 52 is coupled to and/or supported by the frame 12, and positioned behind or rearward of the front axle 76.

As shown in FIGS. 5-8 and 10, the various cooling component of the cooling pack 102 are arranged in a three-dimensional arrangement, rather than a traditional two-dimensional arrangement (i.e., extending vertically up and down with the front and rear faces thereof facing fore-and-aft). Specifically, various cooling components of the cooling pack 102 may be oriented at an angle relative to the vertical direction (e.g., the radiator 120, the primary oil cooler 130, the fuel cooler 140, the condenser 150, the charge air cooler 160, etc.) and/or may be oriented or facing laterally outboard (e.g., the secondary oil cooler(s) 170, etc.). As shown in FIG. 10, (i) the radiator 120, the primary oil cooler 130, the fuel cooler 140, and the condenser 150 are oriented at a first angle, shown as angle $\theta$, relative to a vertical plane (e.g., the vertical plane 16) and (ii) the charge air cooler 160 (a) extends rearward from an upper end of the radiator 120 toward and/or to the fan shroud 182 of the fan system 180 and (b) is oriented at a second, different angle, shown as angle $\alpha$, relative to a vertical plane (e.g., the vertical plane 16). More specifically, the upper ends of the various coolers are positioned further rearward than the lower ends thereof where the radiator 120, the primary oil cooler 130, the fuel cooler 140, and the condenser 150 are oriented more vertical than the charge air cooler 160. Stated another way, the charge air cooler 160 is oriented more horizontal than the other coolers of the cooling pack 102. In such an orientation, the upper end of the charge air cooler 160 is angled more relative to the vertical plane 16 than the upper ends of the other coolers such that the angle $\alpha$ is greater than the angle $\theta$. According to an exemplary embodiment, the angle $\theta$ is between 10 degrees and 45 degrees (e.g., about 10 degrees, about 15 degrees, about 20 degrees, about 25 degrees, about 30 degrees, about 35 degrees, about 40 degrees, about 45 degrees, between 20 and 45 degrees, between 25 and 45 degrees, between 25 and 40 degrees, between 30 and 40 degrees, etc.) and the angle α is between 45 and 85 degrees (e.g., about 45 degrees, about 50 degrees, about 55 degrees, about 60 degrees, about 65 degrees, about 70 degrees, about 75 degrees, about 80 degrees, about 85 degrees, between 50 and 85 degrees, between 60 and 85 degrees, between 70 and 85 degrees, etc.). As shown in FIG. 10, the lower end of the radiator 120 is spaced a first distance from the vertical plane 16 of the front axle 76 and the upper end of the radiator 120 is spaced a second distance from the vertical plane 16 of the front axle 76 that is less than the first distance. In some embodiments, the upper end of the radiator 120 extends rearward past the vertical plane 16. As shown in FIG. 10, the charge air cooler 160 is positioned such that the charge air cooler 160 extends across the vertical plane 16 of the front axle 76 with the upper end of the charge air cooler 160 positioned on the rear side of the vertical plane 16 and the lower end of the charge air cooler 160 positioned on the front side of the vertical plane 16.

As shown in FIGS. 6-10, the cooling pack 102 and the fan system 180 are spaced to cooperatively define a sub-space, sub-volume, or sub-chamber of the hood chamber 24 therebetween, shown as tractive element cloud plenum 26, where (i) the fan shroud 182 defines a rear wall or portion of the tractive element cloud plenum 26, (ii) the radiator 120 defines a front wall or portion of the tractive element cloud plenum 26, and (iii) the charge air cooler 160 defines a top wall or portion of the tractive element cloud plenum 26. As shown in FIGS. 7-9, the front tractive elements 78 are pivotable/steerable through a range of motion that defines a travel path, shown as tractive element cloud 79. The tractive element cloud plenum 26 is configured (e.g., sized, positioned, etc.) such that the front tractive elements 78 extend into the tractive element cloud plenum 26 both behind and beneath the cooling pack 102 when the front tractive elements 78 are pivoted/steered (e.g., to a maximum turn condition or position) and are unobstructed by the cooling pack 102. The front tractive elements 78, therefore, steer behind and underneath the cooling pack 102. Or, stated another way, the cooling pack 102 is positioned in front of and above the tractive element cloud 79.

Figure 11:
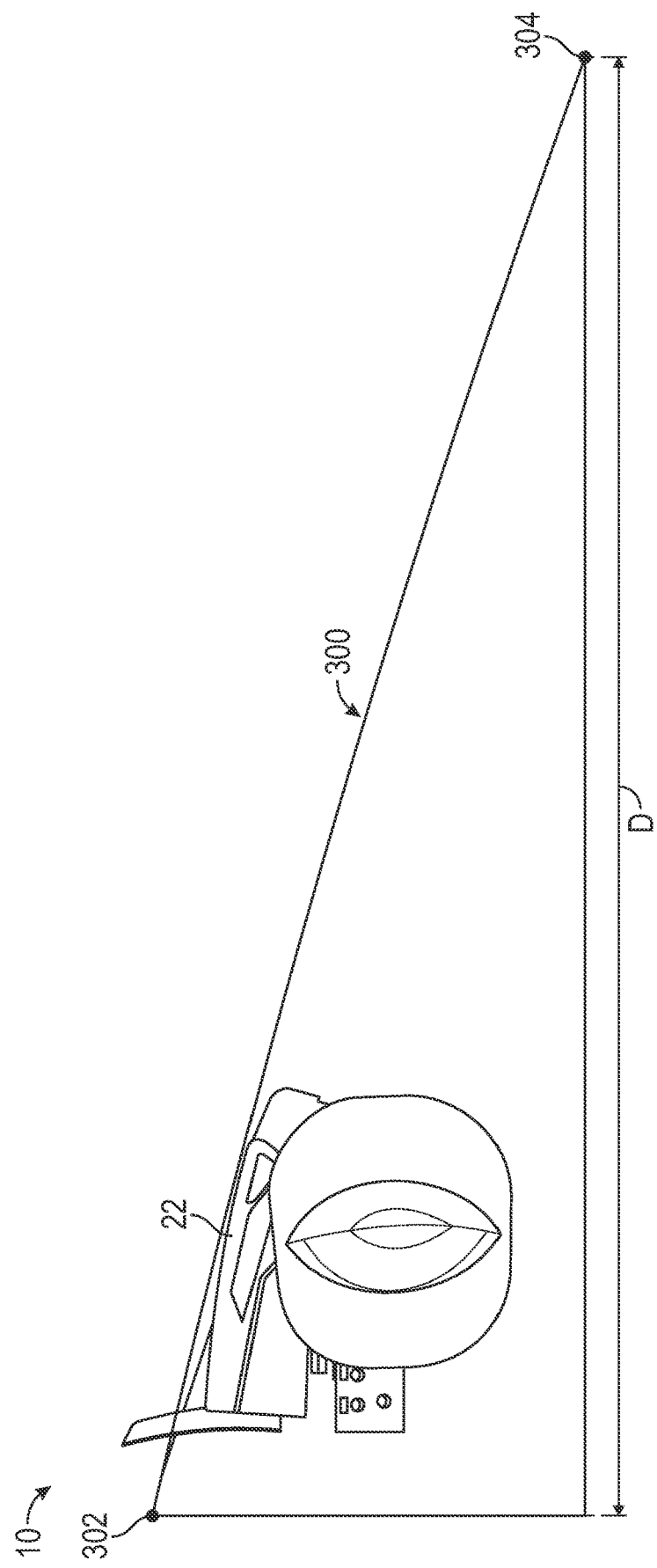
FIGS. 11 and 12 are various view of a visibility profile or sightline from a cab of the vehicle of FIG. 1, according to an exemplary embodiment.
Figure 12:
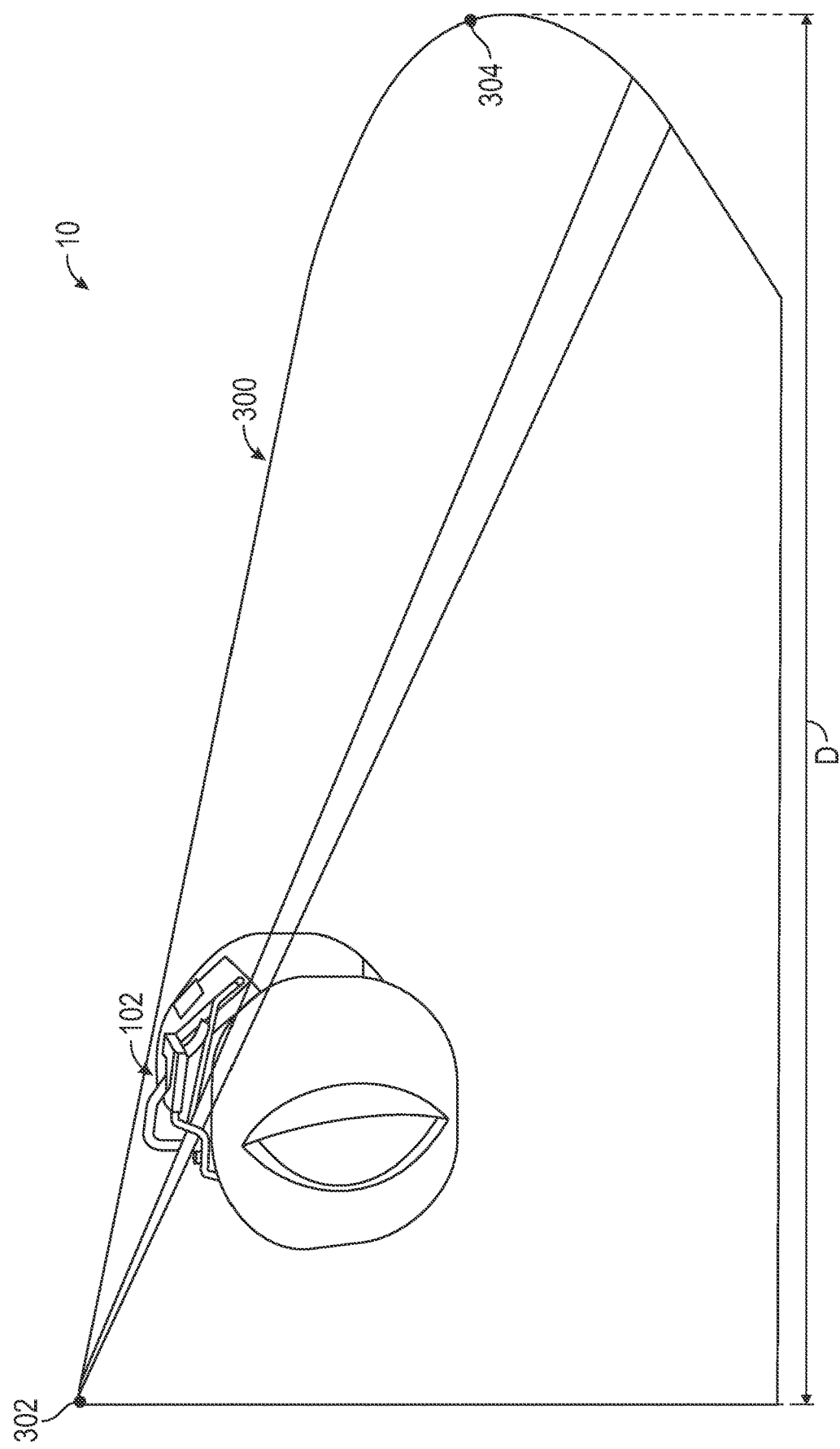

According to an exemplary embodiment, the cooling pack 102 of the present disclosure facilitates accommodating a larger (longer) engine than would typically be installed on a vehicle like the vehicle 10. Typically, installing a larger engine would require extending the wheel base, but the orientation/configuration of the cooling pack 102 prevents the need for such extension. Further, because the cooling pack 102 is not positioned between the tractive element cloud 79, the width of the various cooling components is not limited by the spacing between the front tractive elements 78 and the range of motion thereof. Accordingly, the various components of the cooling pack 102 can be larger (taller and wider) than what would typically be used with a vehicle such as the vehicle 10. According to an exemplary embodiment, the cooling pack 102 facilitates providing the front tractive elements 78 with a minimum sixty inch row crop tread setting. According to the exemplary embodiment shown in FIGS. 11 and 12, the configuration of the cooling pack 102 facilitates designing the hood 22 with a low profile, thereby, enhancing visibility from the cab 30. Specifically, a sightline 300 from an operator viewpoint 302 within the cab 30 extends over the top of the hood 22 to a point 304 on the ground. According to an exemplary embodiment, a horizontal distance D of the sightline 300 between the operator viewpoint 302 and the point 304 is at most twelve meters (i.e., when on a substantially flat and horizontal surface).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the cooling system 100, etc.) as shown in the various exemplary embodiments is illustrative only. Additionally, any element disclosed in one embodiment may be incorporated or utilized with any other embodiment disclosed herein.

The invention claimed is:

1. A machine comprising:
   a frame;
   a front axle coupled to the frame;
   a pair of front tractive elements coupled to the front axle, the pair of front tractive elements steerable through a range of motion that defines a tractive element cloud;
   a prime mover coupled to the frame, the prime mover positioned rearward of the front axle; and
   a cooling system including:

a fan system positioned in front of the prime mover and at least partially over the front axle in a fan over axle arrangement; and a cooling pack including a plurality of heat exchangers, the cooling pack positioned in front of the fan system such that the cooling pack and the fan system cooperatively define a space therebetween;

wherein the pair of front tractive elements are configured to be steered behind the cooling pack and into the space such that the cooling pack is positioned in front of the tractive element cloud.

2. The machine of claim 1, wherein the pair of front tractive elements are configured to be steered behind the cooling pack, underneath the cooling pack, and into the space such that the cooling pack is positioned in front of and above the tractive element cloud.

3. The machine of claim 2, wherein the plurality of heat exchangers of the cooling pack are oriented at one or more angles relative to a vertical plane defined by the front axle.

4. The machine of claim 3, wherein the plurality of heat exchangers include a first heat exchanger oriented at a first angle and a second heat exchanger oriented at a second angle that is different than the first angle.

5. The machine of claim 4, wherein the second heat exchanger extends rearward from an upper end of the first heat exchanger toward the fan system and extends across the vertical plane.

6. The machine of claim 5, wherein the second angle is greater than the first angle such that the second heat exchanger is oriented closer to a horizontal orientation than the first heat exchanger.

7. The machine of claim 6, wherein the first angle is between 10 degrees and 45 degrees, and wherein the second angle is between 45 and 85 degrees.

8. The machine of claim 7, wherein the first angle is between 20 degrees and 45 degrees, and wherein the second angle is between 50 and 85 degrees.

9. The machine of claim 8, wherein the first angle is between 25 degrees and 40 degrees.

10. The machine of claim 8, wherein the second angle is between 60 and 85 degrees.

11. The machine of claim 5, wherein the cooling pack includes a third heat exchanger positioned along a side of the first heat exchanger and the second heat exchanger such that the third heat exchanger faces laterally outboard.

12. The machine of claim 11, wherein the cooling pack includes a fourth heat exchanger positioned along an opposite side of the first heat exchanger and the second heat exchanger such that the fourth heat exchanger faces laterally outboard in an opposite direction than the third heat exchanger.

13. The machine of claim 3, further comprising:
a cab supported by the frame; and
a hood extending over the prime mover and the cooling system;
wherein the orientation of the plurality of heat exchangers of the cooling pack facilitates designing the hood with a low profile, thereby, enhancing visibility from the cab.

14. The machine of claim 13, wherein a sightline from an operator viewpoint within the cab extends over a top of the hood to a point on the ground, and wherein a horizontal distance of the sightline between the operator viewpoint and the point on the ground is at most twelve meters.

15. The machine of claim 1, wherein the cooling pack facilitates providing the pair of front tractive elements with a minimum sixty inch row crop tread setting.

16. A cooling system for a machine, the cooling system including:
a fan system configured to be positioned in front of a prime mover of the machine and at least partially over a front axle of the machine in a fan over axle arrangement; and
a cooling pack configured to be positioned in front of the fan system such that the cooling pack and the fan system cooperatively define a space therebetween, the cooling pack including:
a first heat exchanger configured to be oriented at a first angle; and
a second heat exchanger configured to extend rearward from an upper end of the first heat exchanger toward the fan system, the second heat exchanger configured to be oriented at a second angle that is greater than the first angle;
wherein the space is configured to facilitate steering front tractive elements of the machine between the fan system and the cooling pack such that the cooling pack is positioned in front of and above a tractive element cloud of the front tractive elements.

17. The cooling system of claim 16, wherein the cooling pack includes a third heat exchanger positioned along a side of the first heat exchanger and the second heat exchanger such that the third heat exchanger faces laterally outboard.

18. The cooling system of claim 16, wherein the second heat exchanger is configured to extends across a vertical plane defined by the front axle.

19. The cooling system of claim 16, wherein the first angle is between 20 degrees and 45 degrees, and wherein the second angle is between 60 and 85 degrees.

20. A machine comprising:
a frame;
a cab supported by the frame;
a front axle coupled to the frame;
a pair of front tractive elements coupled to the front axle, the pair of front tractive elements steerable through a range of motion that defines a tractive element cloud;
a prime mover coupled to the frame and positioned rearward of the front axle;
a fan system positioned in front of the prime mover and at least partially over the front axle in a fan over axle arrangement;
a cooling pack positioned in front of the fan system such that the cooling pack and the fan system cooperatively define a space therebetween, the cooling pack including:
a first heat exchanger oriented at a first angle;
a second heat exchanger extending rearward from an upper end of the first heat exchanger toward the fan system, the second heat exchanger oriented at a second angle that is greater than the first angle; and
a hood extending over the prime mover, the fan system, and the cooling pack;
wherein the pair of front tractive elements are configured to be steered behind the cooling pack, underneath the cooling pack, and into the space such that the cooling pack is positioned in front of and above the tractive element cloud; and
wherein the orientation of the first heat exchanger and the second heat exchanger enhances visibility from the cab over the hood by providing a sightline from an operator viewpoint within the cab that extends over a top of the hood to a point on the ground where a horizontal distance of the sightline between the operator viewpoint and the point on the ground is at most twelve meters.

\* \* \* \* \*